(12) United States Patent
Perelli et al.

(10) Patent No.: US 11,016,575 B2
(45) Date of Patent: May 25, 2021

(54) INPUT TOOL

(71) Applicant: Lenovo (Singapore) Pte. Ltd., Singapore (SG)

(72) Inventors: Thomas Perelli, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/941,268

(22) Filed: Mar. 30, 2018

(65) Prior Publication Data
US 2019/0302896 A1 Oct. 3, 2019

(51) Int. Cl.
*G06F 3/02* (2006.01)
*G06F 3/0487* (2013.01)
*G06F 3/0482* (2013.01)

(52) U.S. Cl.
CPC .............. *G06F 3/02* (2013.01); *G06F 3/0482* (2013.01); *G06F 3/0487* (2013.01)

(58) Field of Classification Search
CPC ......... G06F 3/02; G06F 3/0482; G06F 3/0487
See application file for complete search history.

(56) References Cited

U.S. PATENT DOCUMENTS

| | | | | |
|---|---|---|---|---|
| 7,656,386 B1 * | 2/2010 | Goldbaum | .......... | G06F 3/03548 345/156 |
| 9,539,507 B2 * | 1/2017 | Schoenith | ............... | A63F 13/24 |
| 2008/0024388 A1 * | 1/2008 | Bruce | ................... | G06F 1/1622 345/1.1 |
| 2008/0207281 A1 * | 8/2008 | Tsuchiya | ............... | G06F 1/1616 455/575.1 |
| 2010/0073296 A1 * | 3/2010 | Liu | ......................... | H04M 1/02 345/168 |
| 2010/0079403 A1 * | 4/2010 | Lynch | ................... | H03K 17/962 345/174 |
| 2010/0081478 A1 * | 4/2010 | Itoh | ........................ | G06F 1/1616 455/566 |
| 2010/0214257 A1 * | 8/2010 | Wussler | .................. | G06F 3/038 345/174 |
| 2010/0248778 A1 * | 9/2010 | Biswas | ............... | H04M 1/0218 455/556.1 |
| 2010/0250816 A1 * | 9/2010 | Collopy | ................. | G06F 1/1616 710/303 |
| 2013/0120258 A1 * | 5/2013 | Maus | ...................... | G06F 3/044 345/161 |
| 2013/0154943 A1 * | 6/2013 | Joynes | .................. | G06F 3/0219 345/169 |
| 2013/0210258 A1 * | 8/2013 | Retailleau | .......... | H01R 13/6276 439/345 |
| 2014/0139541 A1 * | 5/2014 | Willaert | ................. | G09G 5/003 345/589 |
| 2015/0169080 A1 * | 6/2015 | Choi | ........................ | G06F 3/041 345/174 |
| 2015/0199012 A1 * | 7/2015 | Palmer | .................. | G06F 3/0487 345/184 |
| 2016/0018960 A1 * | 1/2016 | Feng | ................... | G06F 3/04883 715/763 |

(Continued)

*Primary Examiner* — Carolyn R Edwards
(74) *Attorney, Agent, or Firm* — Brian J. Pangrle

(57) ABSTRACT

A computing device can include a processor; memory accessible by the processor; a display operatively coupled to the processor; and an input tool that mounts to a side of the display, where the input tool includes an axis and a wheel rotatable about the axis.

21 Claims, 13 Drawing Sheets

(56) References Cited

U.S. PATENT DOCUMENTS

2016/0054755 A1\* 2/2016 Depenbrock ......... G06F 1/1632
                                                    361/679.09
2017/0153672 A1\* 6/2017 Shin ........................ G06F 1/169

\* cited by examiner

INPUT TOOL

TECHNICAL FIELD

Subject matter disclosed herein generally relates to input tools for computing devices.

BACKGROUND

A mouse can be operatively coupled to a computing device where the mouse can be manipulated by a user's hand to provide input to the computing device to instruct the computing device.

SUMMARY

A computing device can include a processor; memory accessible by the processor; a display operatively coupled to the processor; and an input tool that mounts to a side of the display, where the input tool includes an axis and a wheel rotatable about the axis. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
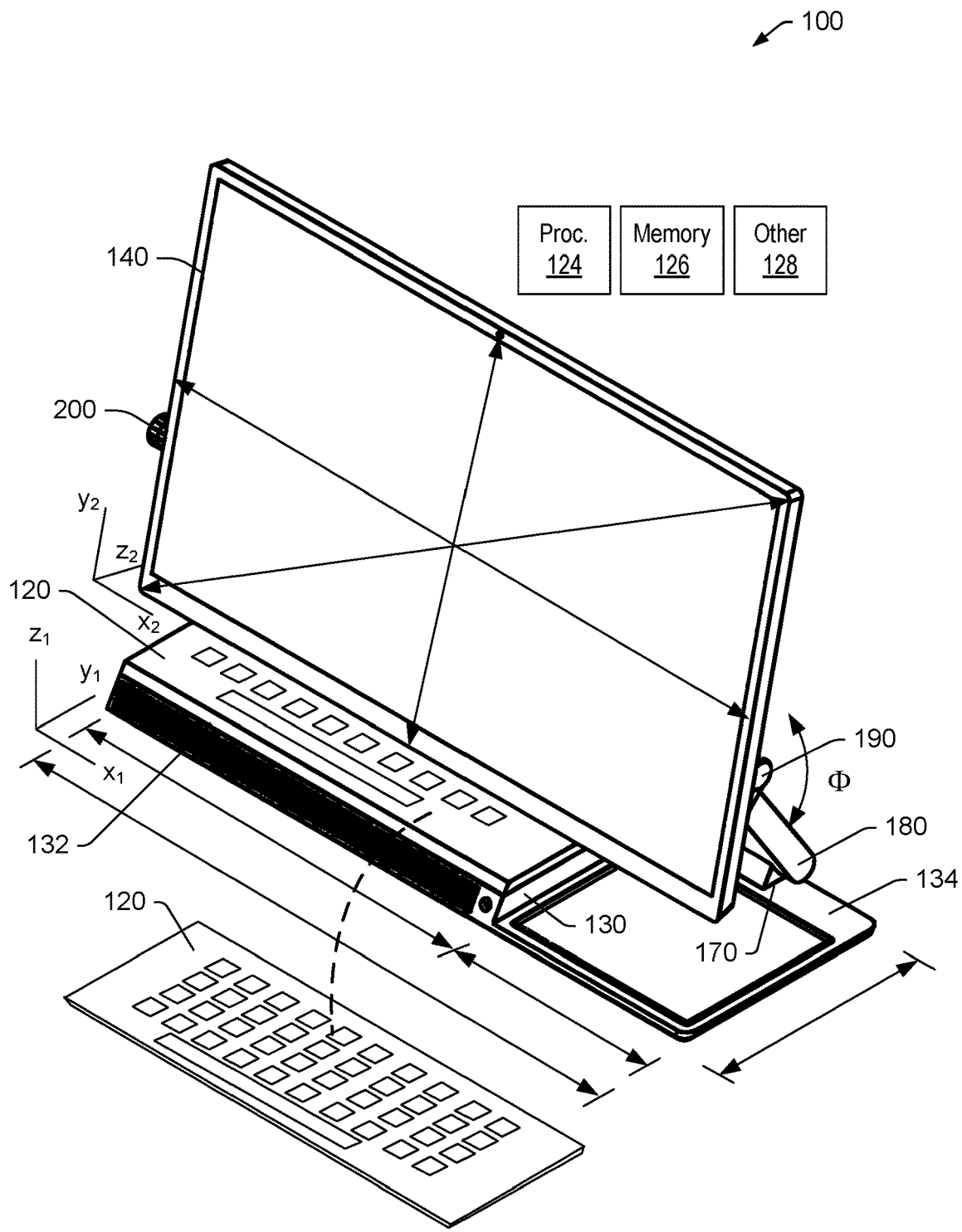
FIG. 1 is a perspective view of an example of a computing device with an example of an input tool.

FIG. 1 shows an example of a computing device 100 that includes a keyboard 120, a base 130 that includes a first platform 132 and a second platform 134, a display 140, and an arm 180 that extends from a lower arm mount 170, that couples the arm 180 to the base 130, to an upper arm mount 190, that couples the arm 180 to the display 140. The base 130 and the display 140 can be defined with respect to one or more coordinate systems such as, for example, one or more Cartesian coordinate systems (see, e.g., $x_1$, $y_1$, $z_1$ and $x_2$, $y_2$, $z_2$).

As shown in FIG. 1, the keyboard 120 may be movable and be in a docked state with respect to the base 130 and in an undocked state, for example, disposed in front of the base 130. For example, in the docked state, the keyboard 120 can be disposed on the platform 132.

As an example, the computing device 100 can include a processor 124, memory 126 and other circuitry 128. As an example, the memory 126 may store instructions executable by the processor 124. For example, operating system instructions may be stored in the memory 126 and executable by the processor 124 to establish an operating system environment that can be implemented to execute applications, control circuitry, receive information, transmit information, etc. As an example, the processor 124 may be included in the base 130 or the display 140 and the memory 126 may be included in the base 130 or the display 140. As an example, one or more processors may be included in the base 130 and/or the display 140. As an example, memory may be included in the base 130 and the display 140.

In the example of FIG. 1, the computing device 100 includes an input tool 200. The input tool 200 includes mechanical features and electronic features where mechanical parts are operatively coupled to electronic circuitry such that the input tool 200 can issue signals that instruct the computing device 100. For example, the input tool 200 can issue signals that instruct the processor 124 of the computing device 100 (e.g., directly and/or indirectly).

As an example, the computing device 100 may include one or more drivers that are associated with various tools where one or more of the drivers is associated with the input tool 200. A driver can provide a software interface to a hardware device, for example, enabling an operating system (e.g., and/or one or more applications, etc.) to access one or more hardware functions. As an example, a driver may communicate with the input tool through one or more wired and/or wireless busses. For example, the input tool 200 may be operatively coupled to circuitry of the computing device 100 via wire and/or via one or more wireless communication circuits (e.g., BLUETOOTH, IR, etc.).

Figure 2:
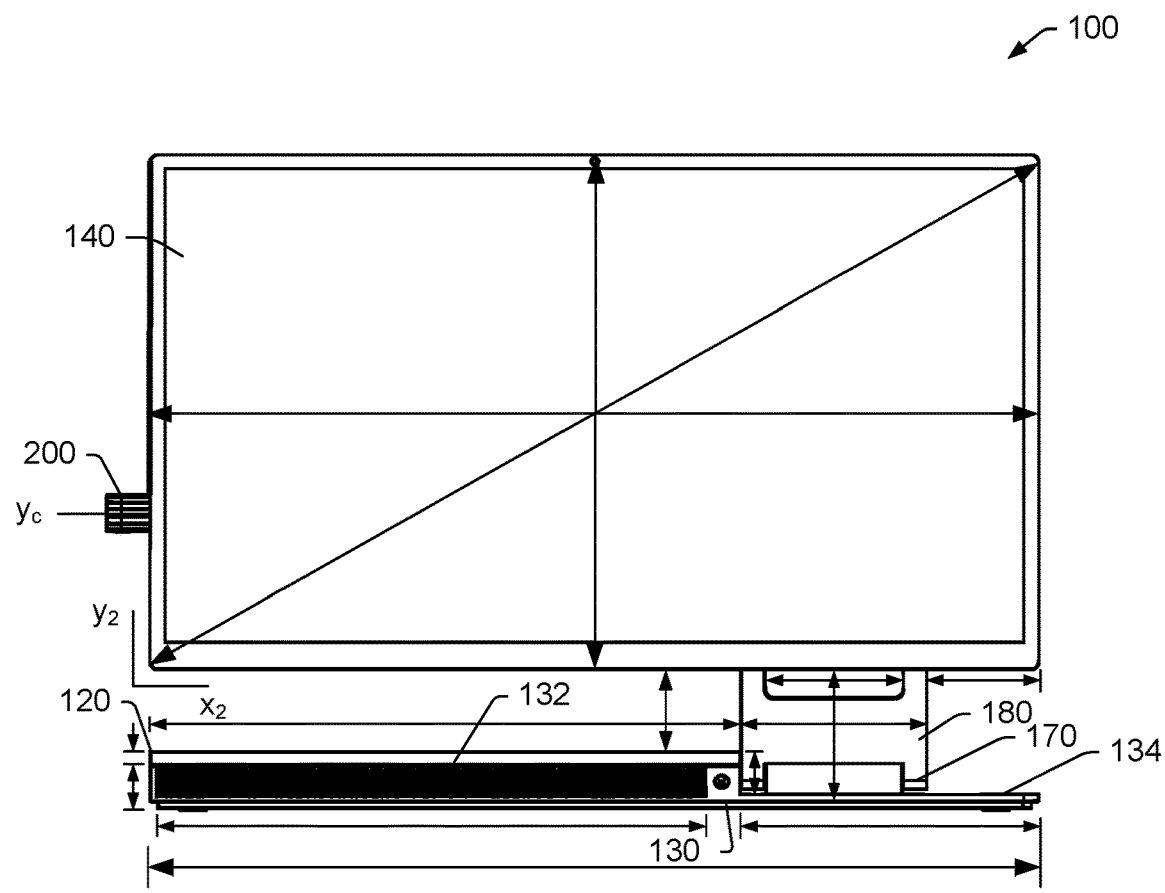
FIG. 2 is a front view and a side view of the computing device of FIG. 1.
Figure 2:
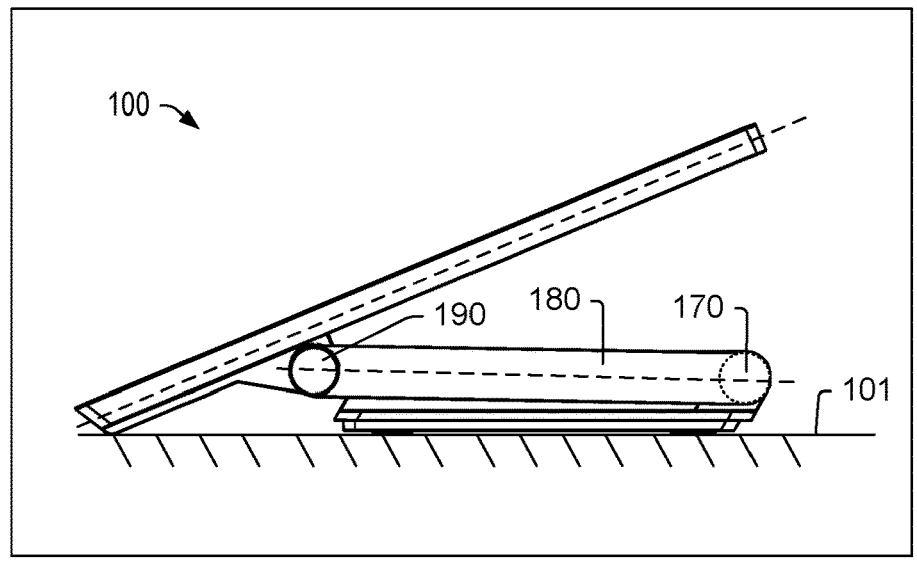

FIG. 2 shows a front view of the computing device 100 of FIG. 1 where various dimensions are illustrated, which may be specified according to one or more of the coordinate systems of FIG. 1. As shown, the input tool 200 is at a position $y_c$, which is in a lower half of the display 140. As an example, the input tool 200 may extend from an end of the upper arm mount 190 or may be at a $y_2$ coordinate position that is even with an axis of the upper arm mount 190 (e.g., an axis about which the display 140 rotates about the arm 180). As an example, the input tool 200 may be operatively coupled to the display 140 at approximately ⅓ of the $y_2$ dimension of the display 140.

FIG. 2 also shows a side view of the computing device 100 in a drawing orientation where the display 140 is at an angle with respect to a horizontal surface 101 such as a surface of a table or a desk. As shown, the upper arm mount 190 is relatively close to the surface 101 and the input tool 200 can be substantially even with an axis of the upper arm mount 190, for example, on the opposing side of the computing device 100. In such an example orientation, a user may utilize one hand to manipulate a stylus to draw with respect to the display 140 (e.g., a digitizer display that includes digitization circuitry that operates in conjunction with a stylus, etc.) while the user may utilize another hand to manipulate the input tool 200. In such an example, the user may utilize the input tool 200 while a forearm of the user is resting on the surface 101. Such an arrangement of features of the computing device 100 improves ergonomic operation of the computing device 100. As an example, in the drawing orientation, the display 140 may be at an angle that is in a range from approximately 15 degrees to approximately 35 degrees with respect to the surface 101 where the input tool 200 is within a distance of approximately 1 cm to approximately 15 cm from the surface 101.

Figure 3:
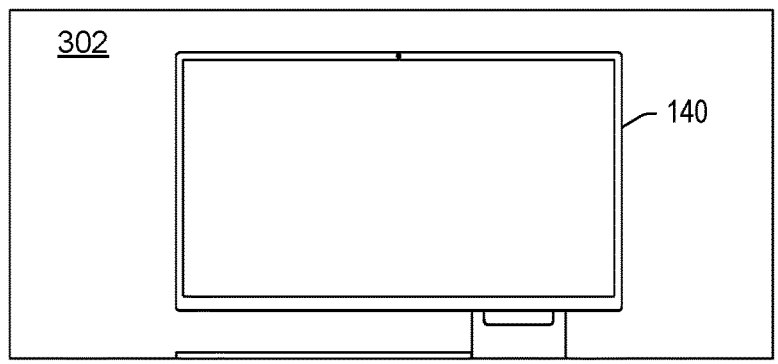
FIG. 3 is a series of front views of examples of arrangements of a computing device with respect to a number of input tools.
Figure 3:
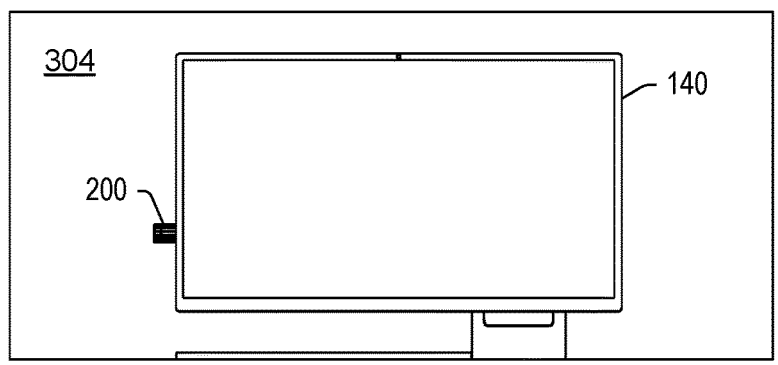
Figure 3:
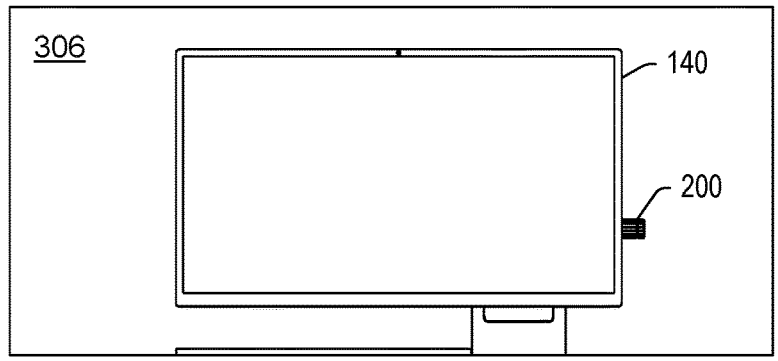
Figure 3:
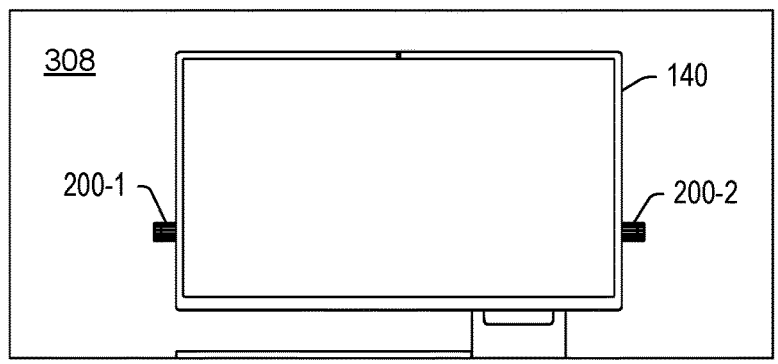

FIG. 3 shows four example orientations 302, 304, 306 and 308 of the computing device 100. In the orientation 302, the input tool 200 is not physically coupled to the display 140. In the orientation 304, the input tool 200 is physically coupled to the left hand side of the display 140. In the orientation 306, the input tool 200 is physically coupled to the right hand side of the display 140. In the orientation 308, two of the input tools 200-1 and 200-2 are physically coupled to the display 140, the input tool 200-1 on the left hand side of the display 140 and the input tool 200-2 on the right hand side of the display 140.

As illustrated in FIG. 3, the input tool 200 may be provided on one side or another side of the display 140 or there may be multiple instances of the input tool 200 where, for example, one may be on one side and one on another side of the display 140; noting that various other examples may include multiple instances of the input tool 200 where, for example, one or more may be operatively coupled to the computing device 100 via a peripheral such as a keyboard, an input device holder, etc.

As shown, the computing device 100 may accommodate a right-handed user that may utilize a stylus in a right hand while utilizing the input device 200 with a left hand (e.g., orientation 304) and may accommodate a left-handed user that may utilize a stylus in a left hand while utilizing the input device 200 with a right hand (e.g., orientation 306).

Figure 4:
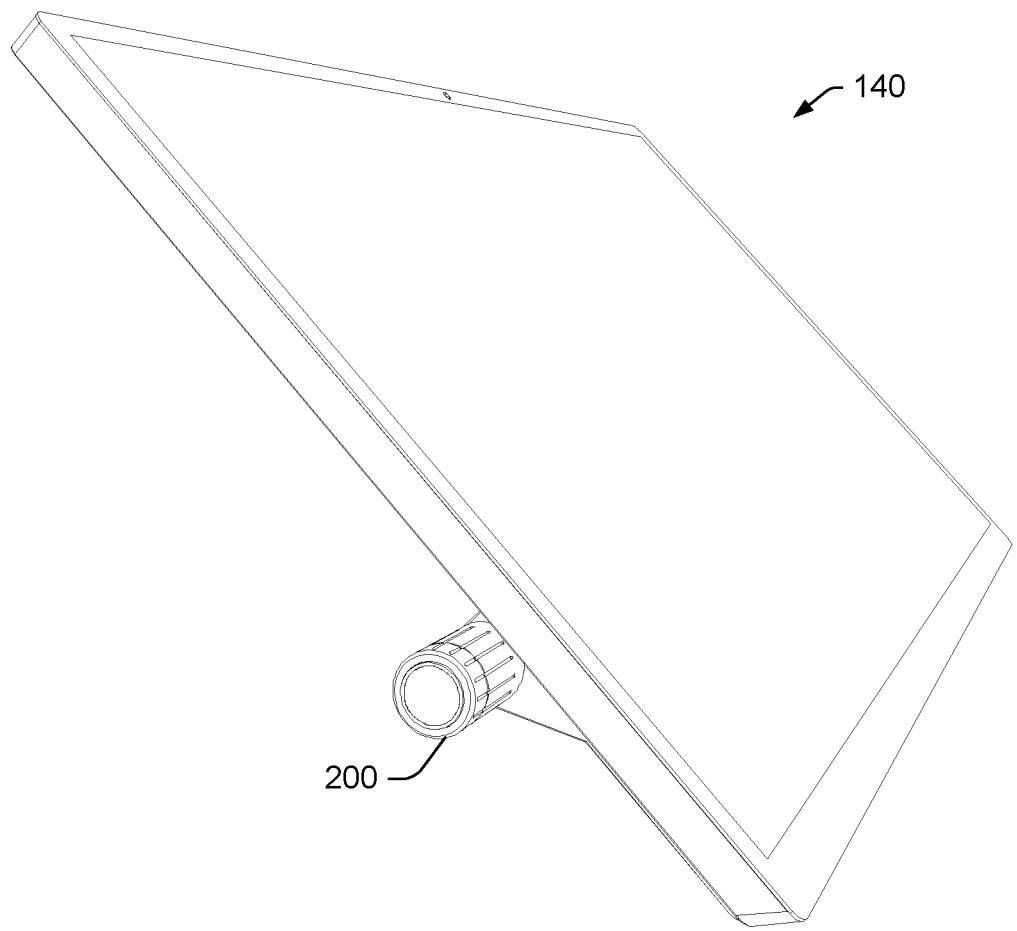
FIG. 4 is a perspective view of an example of a display with an example of an input tool.

FIG. 4 shows an example of the display 140, which may be operable independent of the base 130 and/or may be operable in a physically detached state from the base 130. As shown, the input tool 200 is physically coupled to the left hand side of the display 140.

Figure 5:
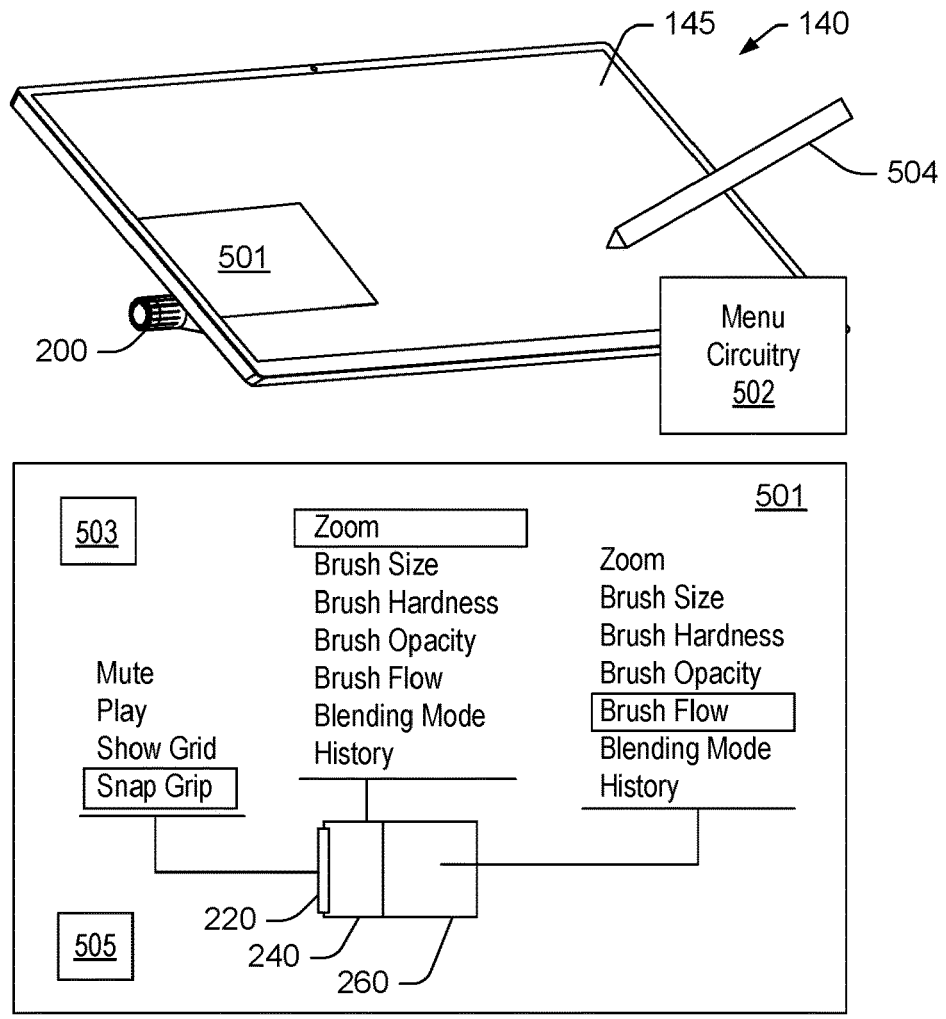
FIG. 5 is a series of views of an example of a display with an example of an input tool and examples of circuitry.
Figure 5:
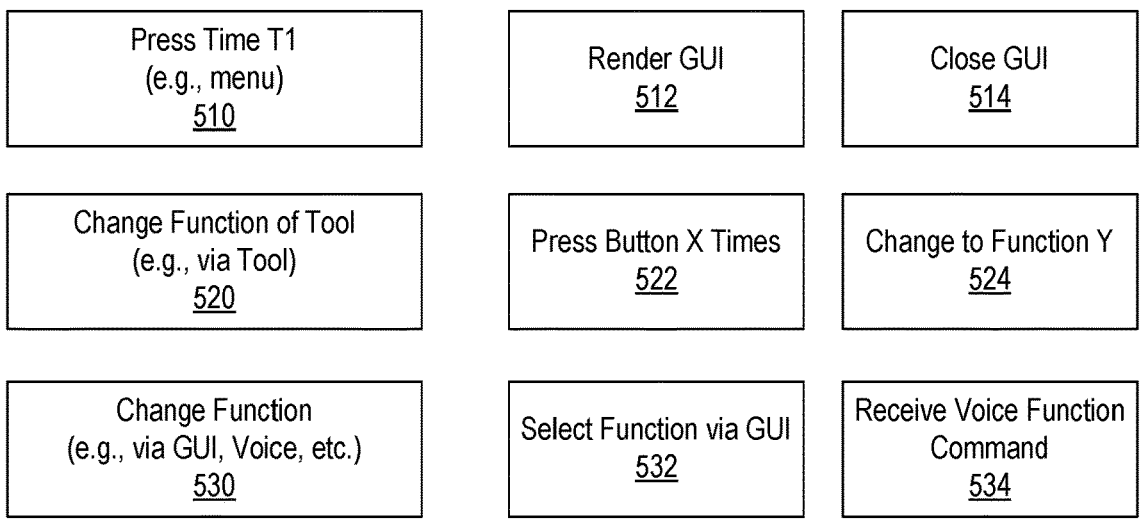

FIG. 5 shows an example of the display 140 with the input tool 200 where a graphical user interface (GUI) 501 is rendered to the display 140, for example, at least in part via menu circuitry 502. Menu circuitry may be associated with a device such as, for example, a stylus 504. Such a stylus may be a digitizer stylus that can be utilized to draw on a display area 145 of the display 140. Menu circuitry may be associated with one or more applications that include stylus functionality.

As an example, a stylus functionality can be a brush functionality where one or more types of brushes and/or brush properties may be selected via a menu or menus and assigned to the stylus. In the ADOBE ILLUSTRATOR framework, different types of brushes include calligraphic, scatter, art, pattern, and bristle. Such brushes can be utilized, for example, as follows: Calligraphic brushes can create strokes that resemble those drawn with an angled point of a calligraphic pen and can be drawn along a center of a path where, as an example, a "Blob Brush" tool can paint with a calligraphic brush and automatically expand the brush stroke into a fill shape that merges with other filled objects of the same color that intersect or are adjacent in stacking order; Scatter brushes can disperse copies of an object (such as a ladybug or a leaf) along a path; Art brushes can stretch a brush shape (such as Rough Charcoal) or object shape evenly along a length of a path; A bristle brush can create brush strokes with the appearance of a natural brush with bristles; Pattern brushes can paint a pattern—made of individual tiles—that repeats along a path where, for example, pattern brushes can include a number of tiles, for sides, inner corner, outer corner, beginning, and end of the pattern; etc.

Some examples of stylus options as to a brush may include angle, size, shape, roundness, diameter, pressure, tilt, bearing, rotation, etc.

As shown in the example of FIG. 5, the GUI 501 can be rendered to the display 140 on a display portion of the display 140 that is proximate to the position of the input tool 200. For example, the GUI 501 can be rendered at a y-coordinate position that includes the $y_c$ coordinate of the input tool 200. In such an example, a user may coordinate hand and eye to select one or more functions of the input tool 200.

In the example of FIG. 5, the input tool 200 is shown as being associated with the GUI 501, which may be part of a driver, an application, etc. The input tool 200 can include a button 220, an outer wheel 240 and an inner wheel 260 where functions may be selected and assigned to the button 220, the outer wheel 240 and the inner wheel 260.

As to some examples, the button 220 can, via the GUI 501, be assigned a mute function, a play function, a show grid function or a snap function. As to some examples, the outer wheel 240 can, via the GUI 501, be assigned a zoom function, a brush size function, a brush hardness function, a brush opacity function, a brush flow function, a blending mode function, and a history function. As to some examples, the inner wheel 260 can, via the GUI 501, be assigned a zoom function, a brush size function, a brush hardness function, a brush opacity function, a brush flow function, a blending mode function, and a history function. As shown, the outer wheel 240 and the inner wheel 260 may have a common set of functions from which a function for each may be selected where such a selected function can be the same or differ for the outer wheel 240 and the inner wheel 260.

In the example of FIG. 5, the GUI 501 also includes a settings graphic control 503 and an application indicator 505. As an example, the settings graphic control 503 may be selected to adjust one or more setting associated with the input tool 200 (e.g., or multiple input tools). As an example, the application indicator 505 may render an icon and/or other information as to a currently utilized application (e.g., a graphics application, a CAD application, a photo editor application, etc.). As an example, one or more of the applications may be a digital content creator application (e.g., a DCC application). As an example, the input tool 200 may be a DCC input tool that can operatively interact with a DCC application.

FIG. 5 also shows some examples of operations. For example, consider a press block 510 where a press of the button 220 for a time T1 (e.g., or longer, etc.) causes a menu to be rendered to the display 140 (e.g., the GUI 501, etc.). As shown, in response, per a render block 512, the computing device 100 (e.g., or the display itself) may render a GUI to the display 140. In such an example, after a period of time of non-interaction with the GUI, the GUI may be closed, as indicated by a close block 514.

As to a change function of tool block 520, consider a press block 522 where a press of the button X times causes a change in function of the input tool 200, for example, to a function of the outer wheel 240 and/or the inner wheel 260, per the change to function Y block 524.

As to a change function block 530, consider one or more changes made via a GUI, a voice command, etc. As shown per a selection block 532, a function may be selected via a GUI (see, e.g., the GUI 501, etc.) and/or, per a reception block 534, a voice function command may be received (e.g., via a microphone of the input tool 200 and/or the computing device 100).

Figure 6:
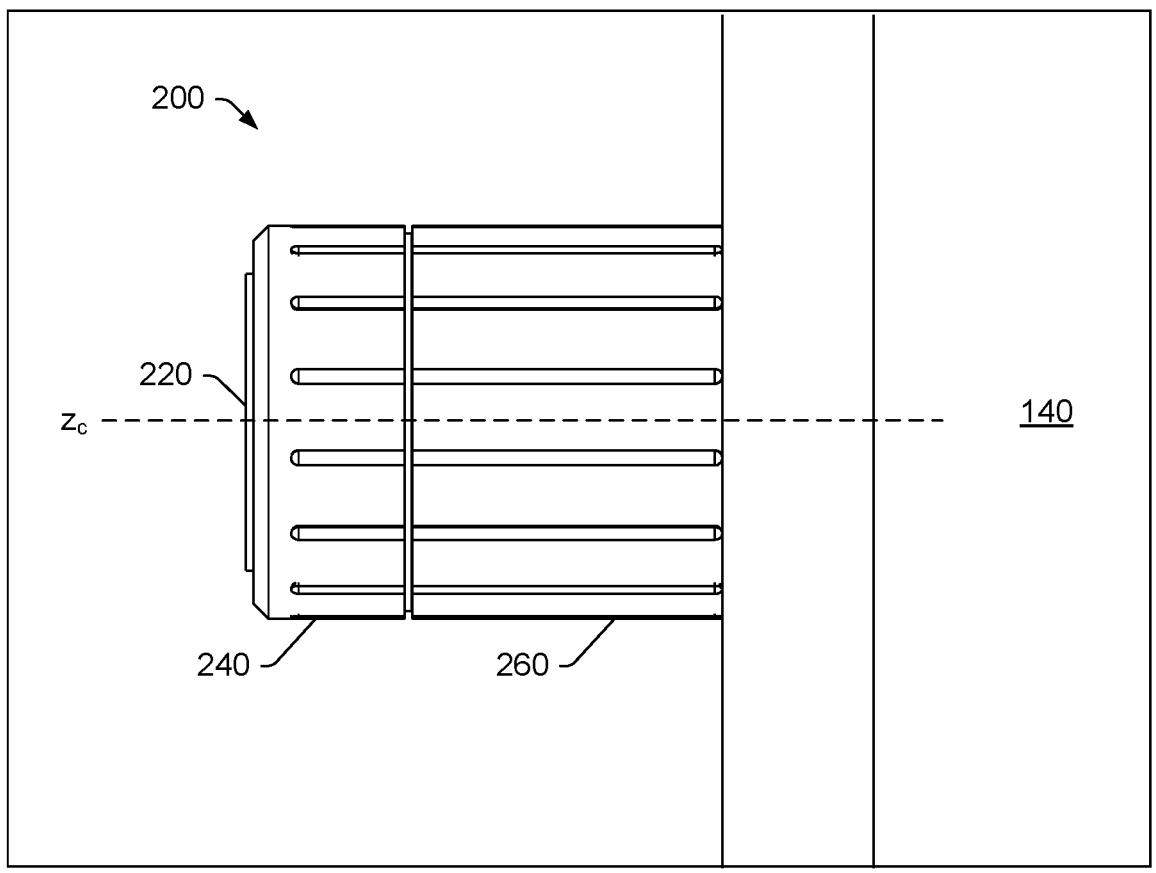
FIG. 6 is a side view of the input tool of FIG. 1.

FIG. 6 shows a side view of the input tool 200 along with a portion of the display 140. As shown, the input tool 200 can be defined with respect to an axis $z_c$, which may be a central axis of the input tool 200 along which the button 220, the outer wheel 240 and the inner wheel 260 are aligned. In such an example, the button 220 may translate along the axis $z_c$, the outer wheel 240 may rotate about the axis $z_c$ and the inner wheel 260 may rotate about the axis $z_c$.

As an example, the input tool 200 may be defined with respect to a cylindrical coordinate system such as r, z, and Θ. In such an example, z may be the axis $z_c$. As an example, a wheel may be defined by an outer radius or an outer diameter. As an example, a wheel may be knurled and/or include other features that can facilitate grip by a hand. As an example, an outer radius of an input tool may be less than approximately 10 cm. As an example, an axial length of an input tool (e.g., as mounted to a display) may be less than approximately 25 cm.

Figure 7:
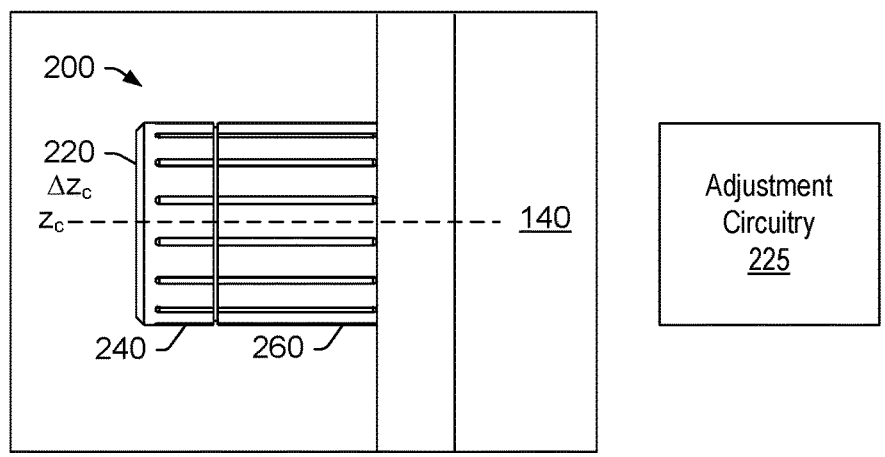
FIG. 7 is a series of views of examples of operations and circuitry associated with the input tool of FIG. 1.
Figure 7:
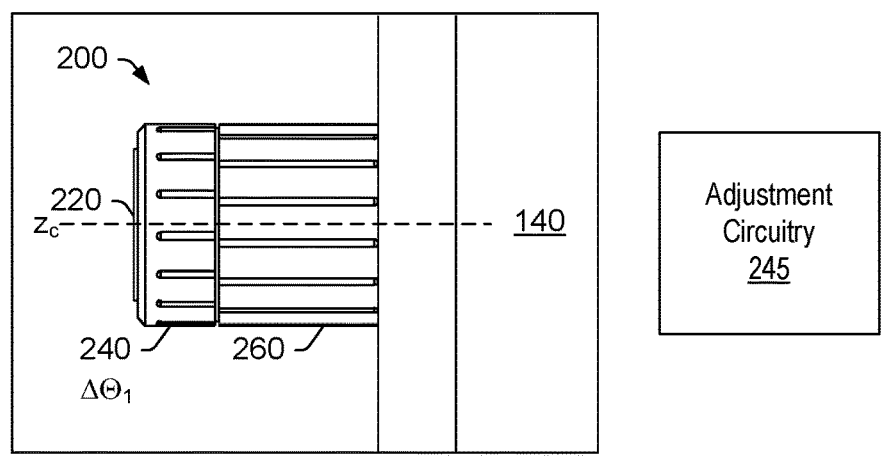
Figure 7:
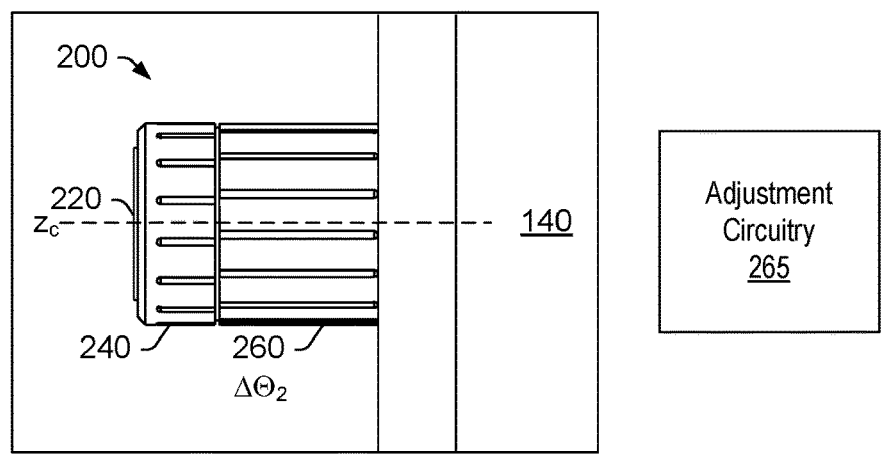

FIG. 7 shows examples of associated adjustment circuitry 225, 245 and 265 that respond to mechanical changes to the button 220, the outer wheel 240 and the inner wheel 260.

As an example, a mechanical change may be a touch to a feature of the input tool 200. For example, the button 220 may be a capacitive touch button that responds to proximity and/or touch of a finger to the button 220. As shown in FIG. 7, the button 220 may be a depressible button that can be physically moved with respect to a direction such as the axial direction of the input tool 200.

As shown in FIG. 7, the outer wheel 240 may be rotated independent of the inner wheel 260 and the inner wheel 260 may be rotated independent of the outer wheel 240. As an example, the outer wheel 240 and the inner wheel 260 may be geared and operatively coupled. For example, consider the outer wheel 240 to be a fine adjustment wheel and the inner wheel 260 to be a coarse adjustment wheel. In such an example, consider menu navigation where the coarse adjustment causes multiple items to be navigated (e.g., incrementing via two or more menu items); whereas, the fine adjustment causes single increment from menu item to menu item.

Figure 8:
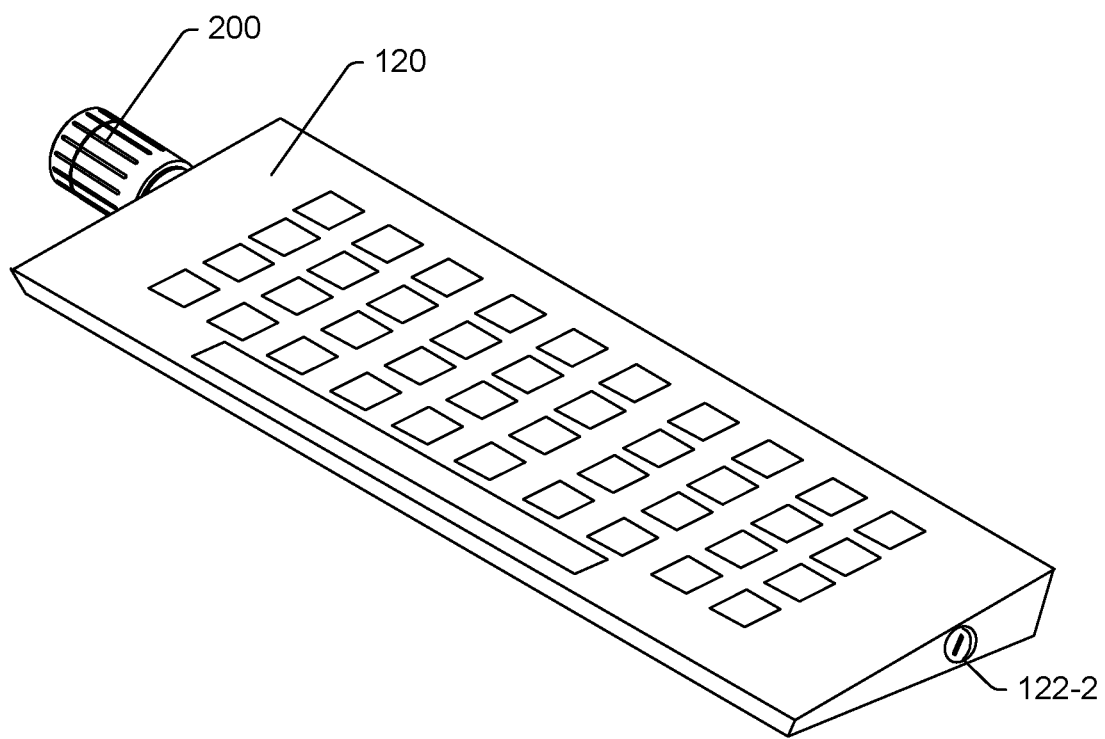
FIG. 8 is a perspective view of an example of a keyboard with an example of an input tool.

FIG. 8 shows an example of the input tool 200 being physically coupled to the keyboard 120. For example, the keyboard 120 may include a socket 122-1 (not shown) that can receive a plug end of the input tool 200. As an example, the keyboard 120 may include a socket on either or both sides (see, e.g., a socket 122-2) to allow for receipt of one or more of the input tools 200.

Figure 9:
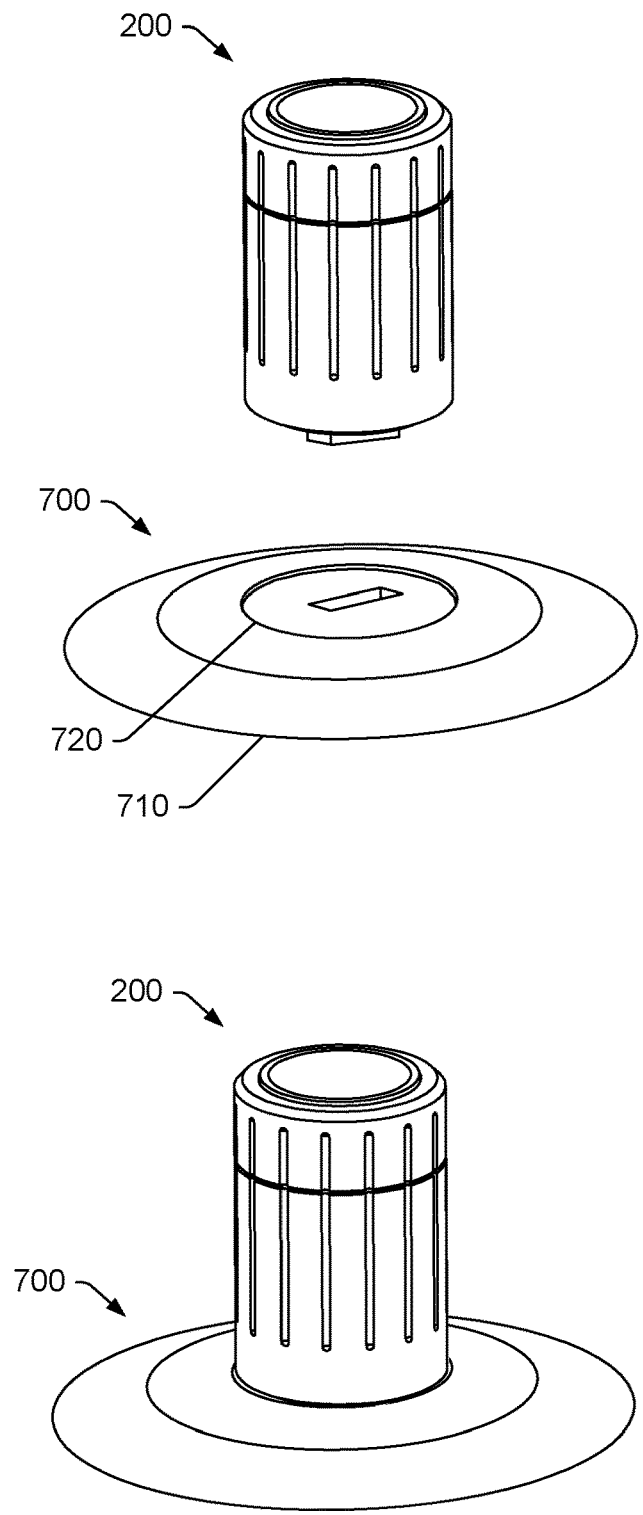
FIG. 9 is a series of perspective views of an example of an assembly that includes an example of an input tool.

FIG. 9 shows an example of an input tool holder 700 that can receive the input tool 200. As shown, the input tool holder 700 can include a base 710 and a socket 720 where the input tool 200 includes a plug end that can be plugged into the socket 720.

Figure 10:
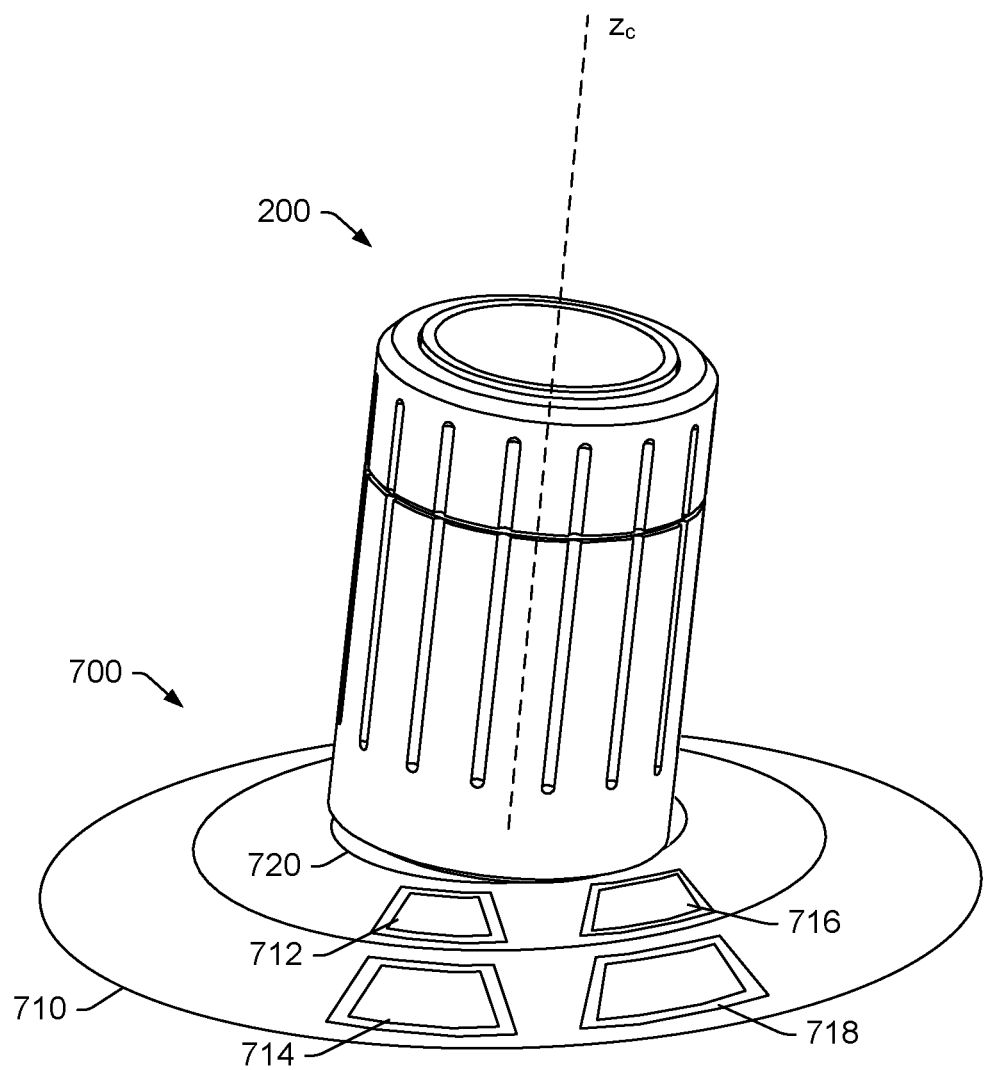
FIG. 10 is a perspective view of an example of an assembly that includes an example of an input tool.

FIG. 10 shows an example of the input tool 200 received by the input tool holder 700 where the input tool 200 may be tiltable via the input tool holder 700 (e.g., consider joystick operations and functions). As shown, the input tool holder 700 may include one or more buttons 712, 714, 716 and 718, which can include various functions that may be associated with one or more functions of the input tool 200.

In the example of FIG. 10, the adjustment circuitry 285 may be associated with the input tool holder 700 and may provide for button and/or tilt functionality of the input tool 200 as received by the input tool holder 700.

Figure 11:
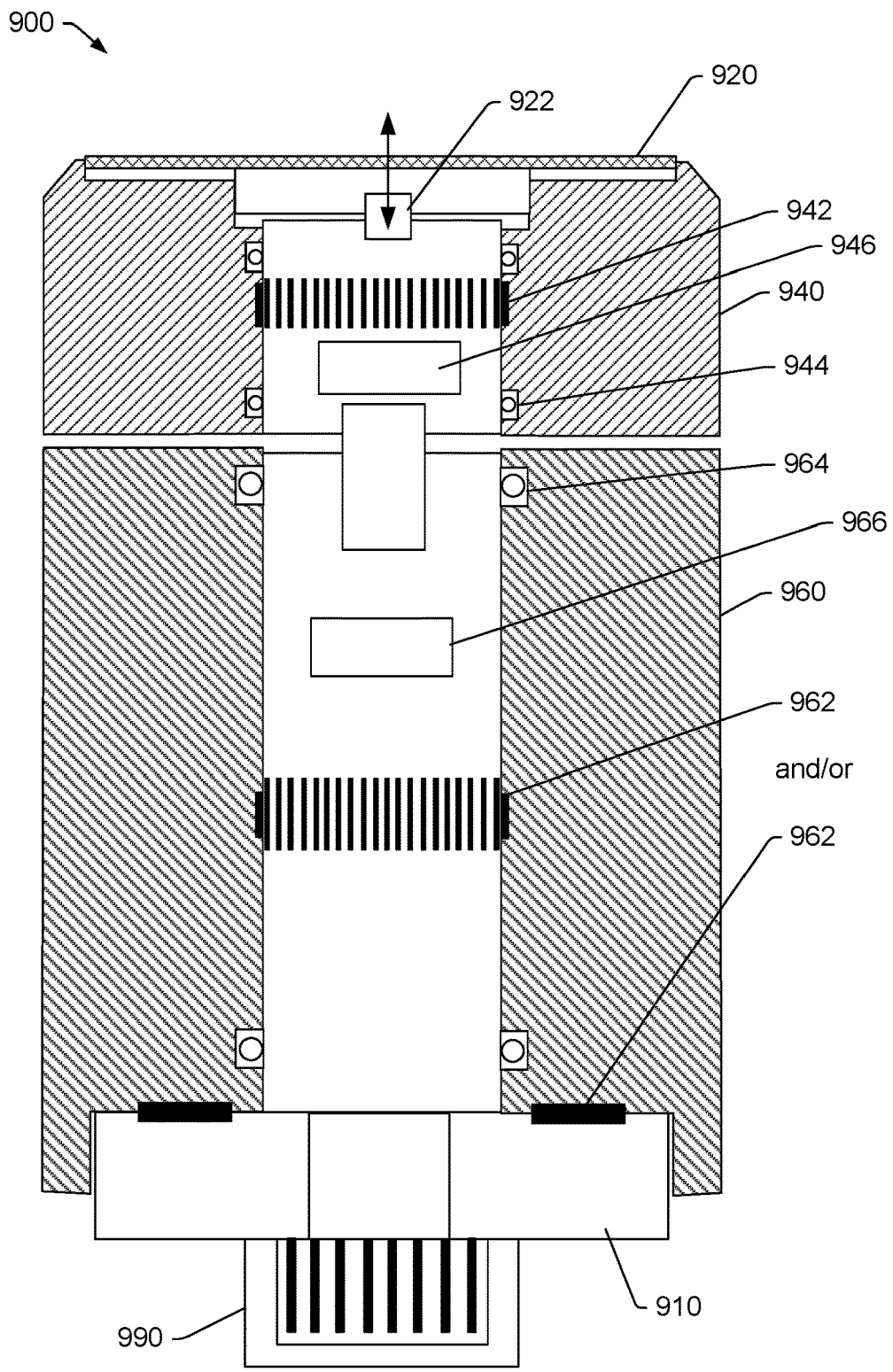
FIG. 11 is an approximate cross-sectional view of an example of an input tool.

FIG. 11 shows an example of an approximate cutaway view of an input tool 900, which can include a support 910 from which a plug 990 extends. As shown, the button 220 can include a button mechanism 922; the outer wheel 940 can include adjustment circuitry 942, one or more bearings 944 (e.g., one or more journal bearings, one or more roller element bearings, etc.), and may include a haptic generator 946; and the inner wheel 960 can include adjustment circuitry 962, one or more bearings 964 (e.g., one or more journal bearings, one or more roller element bearings, etc.), and may include a haptic generator 966.

As an example, the haptic generator 946 and the haptic generator 966 may generate different haptic movements such that when a user's hand is in contact with the input tool 900, the user may receive feedback as to whether the outer wheel 940 or the inner wheel 960 is being rotated. As an example, an application may cause one or more of the haptic generators 946 and 966 to generate one or more movements that may guide a user, for example, to rotate one of the wheels 940 or 960 and/or actuate/de-actuate the button.

Figure 12:
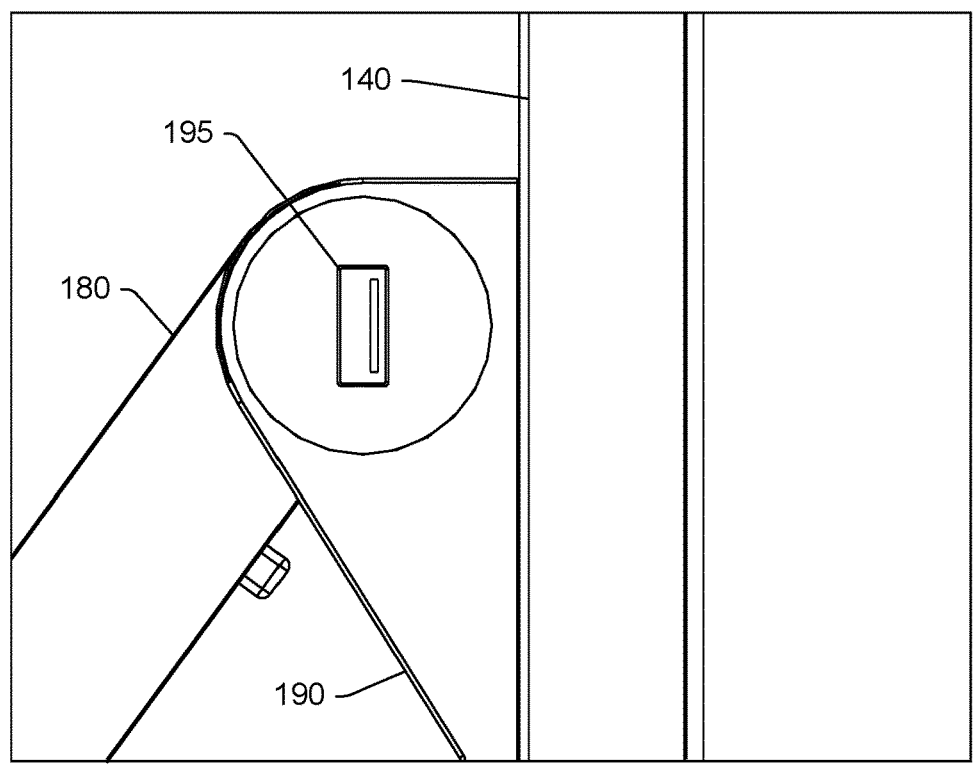
FIG. 12 is a side view of an example of a socket that can operatively couple to an input tool.

FIG. 12 shows an example of a socket 195 as integrated into a portion of the upper arm mount 190 as operatively coupled to the arm 180 and the display 140. As an example, the socket 195 may be a USB or other type of socket. As an example, the socket 195 may be a USB type socket, such as, for example, Type-A, Type-B, Type-C, etc. As an example, the input tool 200 may include a standardized plug at a plug end such that the input tool 200 may be received by one or more devices. As an example, the input tool 200 may be configured to be a "plug-n-play" type of input device.

Digital artists that use a stylus to draw may utilize keyboard commands and/or curser selection of an on screen menu to change one or more features of the stylus (e.g., point size, point type, undo, etc.). Drawing may be expedited where the drawing process is more fluid as to movements and navigation of functions.

A drawing process that uses keyboard commands and/or curser selection with a stylus (e.g., a pen) on screen menu can be interrupted such that fluidity of the drawing experience is impacted. For example, one may have to repeatedly stop and start when drawing to make pen changes, etc., by keyboard commands and/or menu selections using the drawing instrument itself (e.g., the pen) as a curser navigator. In such a process, the user's hand or hands can be up and down over the workspace to conduct/manage the digital drawing process.

As an example, the input tool 200 may decrease time and enhance ergonomics, to make a drawing process more fluid. As an example, the input tool 200 may be utilized with an "all-in-one" (AIO) device and/or one or more other devices.

As mentioned, the input tool 200 may be on a side and attached approximately ⅓ of the way up a display such that wheel (e.g., dial) rotation about an axis can be achieved by a user's hand while the user's arm (from which the hand extends) is resting on a surface (e.g., a table, a desk, etc.).

As mentioned, the input tool 200 can work in a coordinate manner with a stylus to provide a comfortable and efficient workflow experience. As illustrated, when physically coupled to a display, the input tool 200 can include one or more wheels 240 and 260 that can rotate on a horizontal axis allowing a hand to turn one or more of the wheels in a natural hand position, in turn, a comfortable position with the hand's fingers pointing inward. Additionally, having a wheel with an axis in a lower half of a display (e.g., approximately ⅓ of the way up an angled display) provides for resting an arm where wrist or wrist and finger movement may allow for adjustments via the input tool 200.

In the example of FIG. 1, the input tool 200 does not occupy display area of the display 140 and does not interfere with surface area that may be in front of the display 140. As explained with respect to FIG. 3, the input tool 200 may be attachable to either side of the display 140, for example, to accommodate both right and left handed users. As mentioned, the input tool 200 can include one or more wheels (e.g., one or more rings) that provide for same and/or different operations (e.g., functions).

As mentioned, the input tool 200 can include the button 220 as an end button. Such a button may be depressible and/or touch sensitive. As an example, a workflow may include making one or more changes, by either toggling a wheel of the input tool 200 in either direction to make pen changes or push a button on the end of the input tool 200.

As an example, a workflow that utilizes the input tool 200 can provide for maintaining a user's eyes on a display and/or maintaining a stylus on or in close proximity to the display while making one or more changes as to one or more features of an application, the stylus, etc.

As mentioned, the input tool 200 can include circuitry that can be utilized for rendering one or more GUIs to a display for purposes of making one or more selections as to functionality of the input tool 200. As an example, a GUI may be rendered to a display adjacent to the input tool 200 where the input tool 200 extends in a direction horizontally outwardly from the display.

As mentioned, as an example, the input tool 200 may be configured to be removable and replaceable. For example, consider removing the input tool 200 from a socket of a computing device and plugging the input tool 200 into another socket, of the computing device or another device. As an example, the input tool 200 can include a standard type of plug (e.g., USB, etc.) such that it can be operable in a corresponding socket of a device.

As an example, the input tool 200 may help to create a "clean" desk environment as the input tool 200 may be off the desk on a display (e.g., a display housing, display housing mount, etc.) and may optionally be utilized with a keyboard or another component (e.g., an input device holder).

As an example, a computing device can include a processor; memory accessible by the processor; a display operatively coupled to the processor; and an input tool that mounts to a side of the display, where the input tool includes an axis and a wheel rotatable about the axis. In such an example, the display can include a side socket and where the input tool removably mounts to the side of the display via the side socket. In such an example, the display may include another side socket on an opposing side of the display. In such an example, the input tool may be mounted to the display to accommodate preferences of a user, which may be, for example, a right-handed user or a left-handed user. As an example, a right-handed user may hold a stylus in a right hand and utilize the input tool of a left hand and, where the user does not utilize the stylus, the user may optionally mount the input tool to the right side of the display to utilize it with the right hand. Such an example, may apply to a left-handed user as well.

As an example, a display can include a serial bus connector where an input tool includes a serial bus connector that mates with the serial bus connector of the display.

As an example, a computing device can include menu circuitry, where an input tool is operatively coupled to the menu circuitry. In such an example, the menu circuitry can render a menu to a display of the computing device where the menu is navigable at least in part via rotation of the wheel of the input tool. As an example, menu circuitry can include stylus menu items where rotation of a wheel of an input tool navigates at least a portion of the stylus menu items. As an example, a menu may be rendered to a portion of a display that is adjacent to a mount of an input tool. For example, an axis of a wheel of an input tool may be a longitudinal axis that if extended to the display would coincide with a portion of the rendered menu.

As an example, a computing device can include a plurality of input tools. For example, consider a right one and a left one or one on a side of a display and another set in a base, etc.

As an example, an input tool can include a button, which may be, for example, an end button. As an example, an input tool can include a plurality of wheels. As an example, a wheel of an input tool can be an outer wheel where the input tool includes another wheel that is an inner wheel that is rotatable about a common axis with the outer wheel.

As an example, a computing device can include adjustment circuitry that issues a signal responsive to an adjustment to a wheel or wheels of an input device. In such an example, the signal can instruct a processor of the computing device (e.g., via one or more drivers, APIs, etc.). As an example, an input tool may be operatively coupled to a processor via wired circuitry and/or wireless circuitry.

As an example, a keyboard can include a socket where an input tool includes a plug end that is receivable by the socket to operatively couple the input tool to circuitry of the keyboard.

As an example, an input tool holder can include a base, where the input tool holder includes a socket and where an input tool includes a plug end that is receivable by the socket to operatively couple the input tool to circuitry of the input tool holder.

As an example, a display can include a widthwise dimension that extends from a left side to a right side of the display and a heightwise dimension that extends from a bottom side to a top side of the display, where the input tool mounts to the left side of the display (see, e.g., FIG. 1, dimensions $x_2$ being widthwise and $y_2$ being heightwise while $z_2$ can define a thickness). As an example, an input tool can mount to a left side of a display along a bottom half of the display (see, e.g., the display 140 of FIG. 1 being divided by a horizontal widthwise line to define a top half and a bottom half). As an example, a computing device can include a base and an arm operatively coupled to the base, where a display includes an arm mount that operatively couples to the arm. In such an example, the arm mount can include an axis where the axis of an input tool is substantially aligned with the axis of the arm mount.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 13:
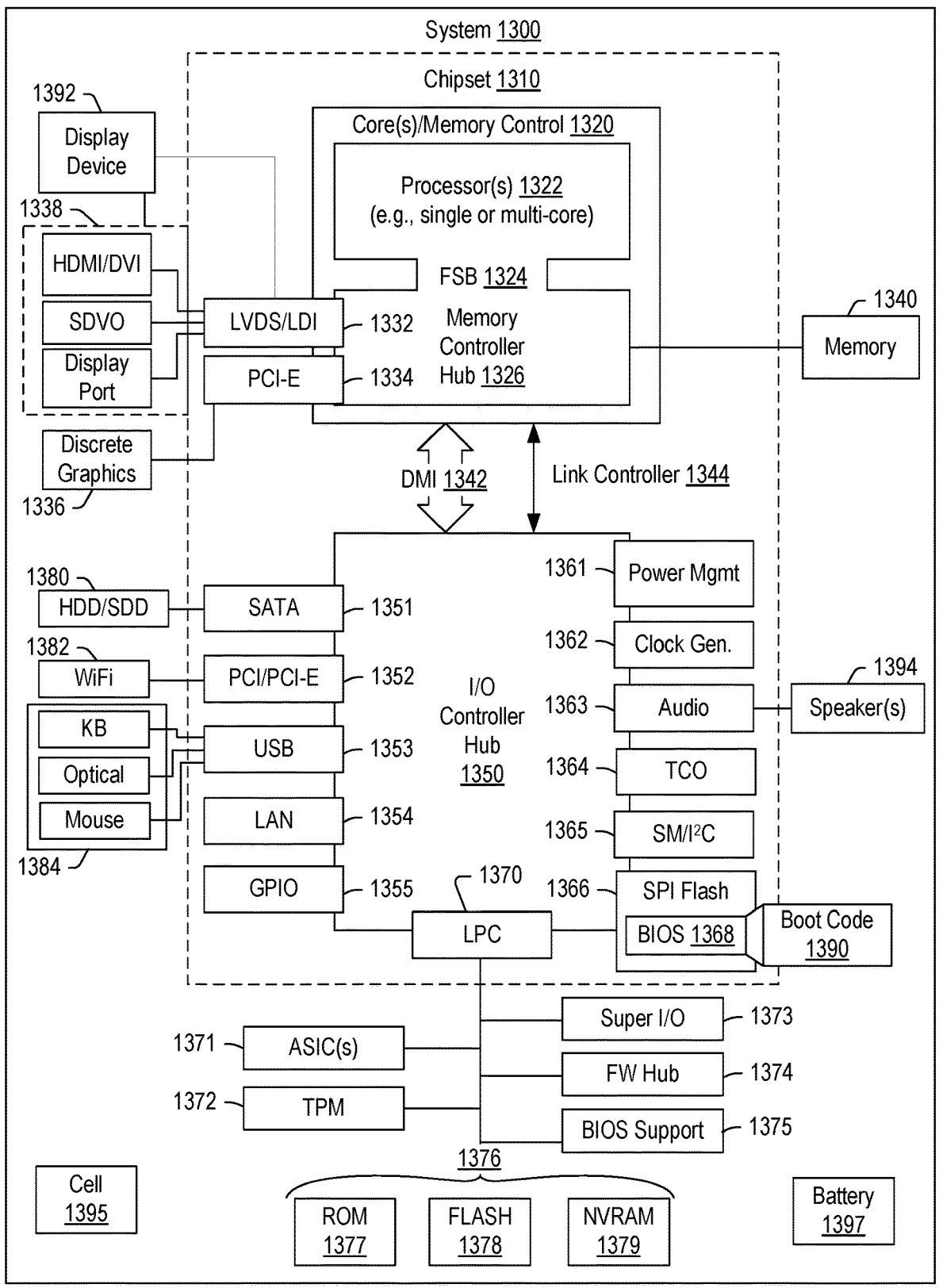
FIG. 13 is a diagram of examples of components of a system.

While various examples of circuits or circuitry have been discussed, FIG. 13 depicts a block diagram of an illustrative computer system 1300. The system 1300 may be a computer system sold by Lenovo (US) Inc. of Morrisville, N.C. (e.g., a ThinkStation® system); however, as apparent from the description herein, a satellite, a base, a server or other machine may include other features or only some of the features of the system 1300. As described herein, a monitor or machine such as the display 140 and/or the base 130 may include at least some of the features of the system 1300.

As an example, a monitor may include features such as one or more of the features included in one of the LENOVO® IDEACENTRE® or THINKCENTRE® "all-in-one" computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920 x 1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 13, the system 1300 includes a so-called chipset 1310. A chipset refers to a group of integrated circuits, or chips, that are designed to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
 a processor;
 memory accessible by the processor;
 a stylus;
 a display operatively coupled to the processor, wherein the display comprises digitization circuitry operable via the stylus;
 a base;
 an arm operatively coupled to the base, wherein the display comprises an arm mount that operatively couples to the arm to define a rotational axis wherein the display is rotatable about the rotational axis; and
 an input tool that mounts to a side of the display, wherein the input tool comprises a wheel rotatable about an axis that controls digitization circuitry stylus functionality, wherein the input tool mounts to the side of the display such that the axis is substantially parallel to the rotational axis.

2. The computing device of claim 1 wherein the display comprises a left side socket and wherein the input tool removably mounts to the side of the display via the left side socket.

3. The computing device of claim 2 wherein the display comprises a right side socket on a right side of the display, and wherein the computing device comprises circuitry for a right-handed configuration that receives input of the stylus via a right hand and input of the input tool in the left side socket via a left hand and a left-handed configuration that receives input of the stylus via a left hand and input of the input tool in the right side socket via a right hand.

4. The computing device of claim 1 wherein the display comprises a serial bus connector and wherein the input tool comprises a serial bus connector that mates with the serial bus connector of the display.

5. The computing device of claim 1 comprising menu circuitry, wherein the input tool is operatively coupled to the menu circuitry.

6. The computing device of claim 5 wherein the menu circuitry renders a menu to the display wherein the menu is navigable at least in part via rotation of the wheel of the input tool.

7. The computing device of claim 5 wherein the menu circuitry comprises stylus menu items and wherein rotation of the wheel of the input tool navigates at least a portion of the stylus menu items.

8. The computing device of claim 1 wherein the input tool comprises a button.

9. The computing device of claim 8 wherein the button comprises an end button.

10. The computing device of claim 1 wherein the input tool comprises a plurality of wheels.

11. The computing device of claim 1 wherein the wheel comprises an outer wheel and wherein the input tool comprises an inner wheel that is rotatable about the axis.

12. The computing device of claim 1 comprising adjustment circuitry that issues a signal responsive to an adjustment to the wheel.

13. The computing device of claim 12 wherein the signal instructs the processor.

14. The computing device of claim 1 wherein the input tool is operatively coupled to the processor via wired circuitry.

15. The computing device of claim 1 wherein the input tool is operatively coupled to the processor via wireless circuitry.

16. The computing device of claim 1 further comprising a keyboard, wherein the keyboard comprises a socket and wherein the input tool comprises a plug end that is receivable by the socket to operatively couple the input tool to circuitry of the keyboard.

17. The computing device of claim 1 further comprising an input tool holder that comprises a base, wherein the input tool holder comprises a socket and wherein the input tool comprises a plug end that is receivable by the socket to operatively couple the input tool to circuitry of the input tool holder.

18. The computing device of claim 1 wherein the display comprises a widthwise dimension that extends from a left side to a right side of the display and a heightwise dimension that extends from a bottom side to a top side of the display, wherein the input tool mounts to the left side of the display.

19. A computing device comprising:
 a processor;
 memory accessible by the processor;
 a display operatively coupled to the processor;
 a base;
 an arm operatively coupled to the base, wherein the display comprises an arm mount that operatively couples to the arm to define a rotational axis wherein the display is rotatable about the rotational axis;
 an input tool that mounts to a side of the display, wherein the input tool comprises a wheel rotatable about an axis, wherein the input tool mounts to the side of the display such that the axis is substantially parallel to the rotational axis; and
 menu circuitry, wherein the input tool is operatively coupled to the menu circuitry, wherein the menu circuitry comprises stylus menu items and wherein rotation of the wheel of the input tool navigates at least a portion of the stylus menu items.

20. A computing device comprising:
 a processor;
 memory accessible by the processor;
 a display operatively coupled to the processor;
 a base;
 an arm operatively coupled to the base, wherein the display comprises an arm mount that operatively couples to the arm to define a rotational axis wherein the display is rotatable about the rotational axis; and
 an input tool that comprises a wheel rotatable about an axis, wherein the input tool is mountable to the display wherein the axis of the input tool is substantially aligned with the rotational axis.

21. The computing device of claim 20, wherein the arm mount comprises a socket wherein the input tool is mountable to the display via the socket.

\* \* \* \* \*